(12) United States Patent
Yoo

(10) Patent No.: US 9,897,808 B2
(45) Date of Patent: Feb. 20, 2018

(54) SMART GLASS

(71) Applicant: LG ELECTRONICS INC., Seoul (KR)

(72) Inventor: Daewon Yoo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 734 days.

(21) Appl. No.: 14/320,709

(22) Filed: Jul. 1, 2014

(65) Prior Publication Data

US 2015/0002676 A1    Jan. 1, 2015

(30) Foreign Application Priority Data

Jul. 1, 2013    (KR) .................. 10-2013-0076648

(51) Int. Cl.
| | |
|---|---|
| *G02B 27/01* | (2006.01) |
| *H04N 7/18* | (2006.01) |
| *G06T 19/00* | (2011.01) |
| *G06F 3/01* | (2006.01) |
| *H04N 7/14* | (2006.01) |

(52) U.S. Cl.
    CPC ....... *G02B 27/0172* (2013.01); *G02B 27/017* (2013.01); *G06F 3/013* (2013.01); *G06T 19/006* (2013.01); *H04N 7/181* (2013.01); *G02B 2027/014* (2013.01); *G02B 2027/0138* (2013.01); *G02B 2027/0178* (2013.01); *G02B 2027/0187* (2013.01); *H04N 7/144* (2013.01); *H04N 7/185* (2013.01)

(58) Field of Classification Search
    CPC ... G02B 27/0172; G02B 27/017; G06F 3/013; G06T 19/006; H04N 7/181
    USPC ........................................... 348/159
    See application file for complete search history.

(56) References Cited

U.S. PATENT DOCUMENTS

| | | | |
|---|---|---|---|
| 2012/0194552 A1* | 8/2012 | Osterhout | G02B 27/0093 345/633 |
| 2015/0279389 A1* | 10/2015 | LeBeau | G06F 3/167 704/275 |
| 2016/0187654 A1* | 6/2016 | Border | G02B 5/04 359/567 |

* cited by examiner

*Primary Examiner* — Mehrdad Dastouri
*Assistant Examiner* — Kristin Dobbs
(74) *Attorney, Agent, or Firm* — KED & Associates, LLP

(57) ABSTRACT

A smart glass may include a glass having a transparent display function, a first camera obtaining a front image, a second camera obtaining an image of a user's eyes, and a controller which analyzes the front image and the image of the user's eyes, determines a specific object selected by the user's gaze from a plurality of objects included in the front image based on the result of an analysis, obtains information about the specific object, and displays the information about the specific object on a transparent display area of the glass. The smart glass may provide information about the specific object selected by the user's gaze, and/or may execute a specific function corresponding to user's eye gesture.

14 Claims, 15 Drawing Sheets

Front image

Image of user's eyes

Transparent display area(131) | Within an angle of view of camera | Outside an angle of view of camera ◯ Eye Tracking ⇩ Rotate camera and take video ⇩

Transparent display area (131)

Image including outside portion of an angle of view of camera(135)

Record front image when user's eyes are closed
for a predetermined period of time Recognize NFC tag of public transportation card Sense the instant user dozes through eye tracking Transparent display area (131)

Perform an alarm function at a position, where user has to get off, through position tracking

SMART GLASS

CROSS-REFERENCE TO RELATED APPLICATION

This application claims priority under 35 U.S.C. § 119 to Korean Patent Application No. 10-2013-0076648 filed on Jul. 1, 2013, whose entire disclosure is hereby incorporated by reference.

BACKGROUND

1. Field

Embodiments relate to a smart glass, and more particularly to a smart glass capable of taking and analyzing a front image and an image of user's eyes to provide information about a front object selected by user's gaze based on the result of an analysis or to execute a specific function corresponding to user's eye gesture based on the result of the analysis.

2. Background

Recent study and commercialization of a wearable computing system that may be directly worn by a user has been actively carried out. In particular, an interest in a smart glass, which may provide various different types of data and functionality through a glass worn by a user like glasses and which may provide a cellular phone function, a camera function, and other such functions, has greatly increased.

BRIEF DESCRIPTION OF THE DRAWINGS

The embodiments will be described in detail with reference to the following drawings in which like reference numerals refer to like elements wherein.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Certain smart glass applications may display information on a transparent display, and information related to objects in front of the user may be obtained through a front facing camera attached to the glass. However, information obtained using only the front camera may be somewhat limited, and thus the related information provided to the user may also be somewhat limited.

In particular, it may be difficult to discern an object being selected by the user through eye position, movement and the like using only an image obtained by the front camera, and also may also be difficult to accurately provide information requested by the user.

Figure 1:
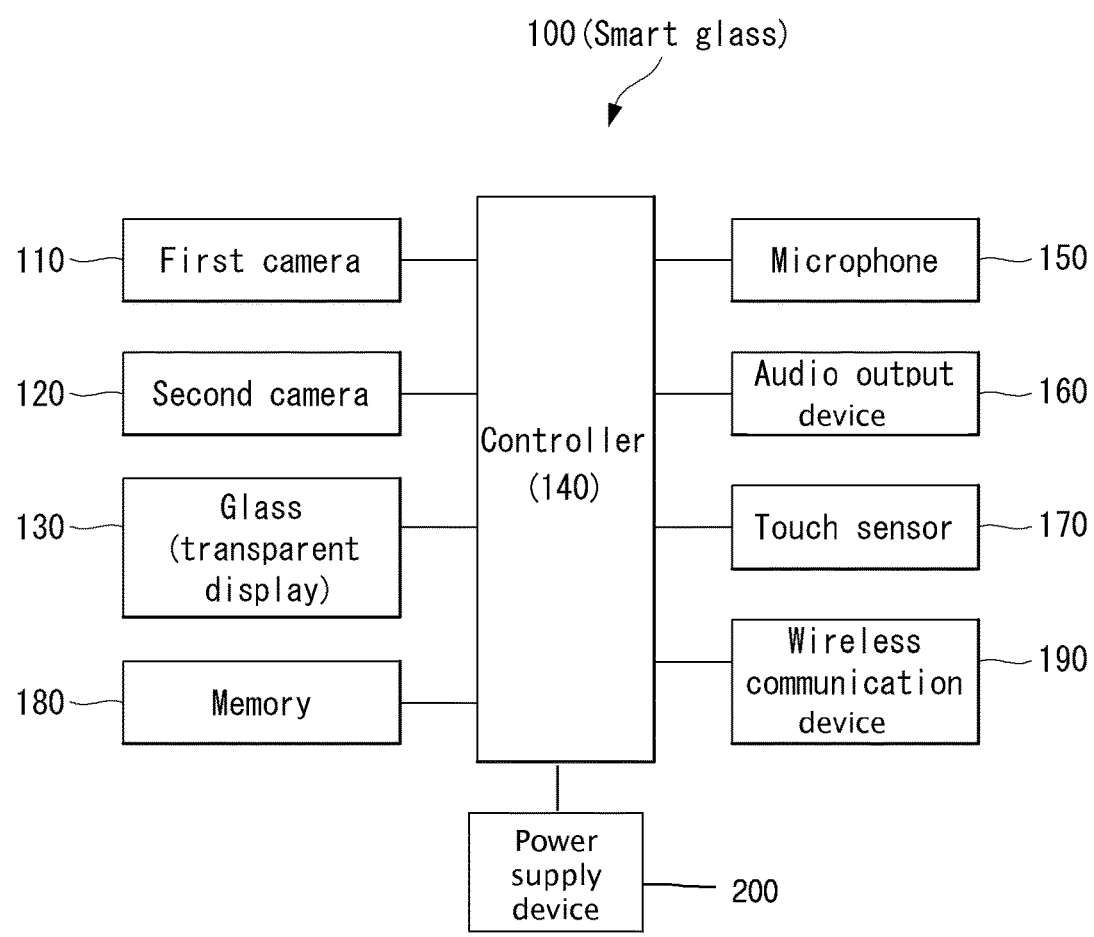
FIG. 1 is a block diagram of a smart glass according to an exemplary embodiment.
Figure 2:
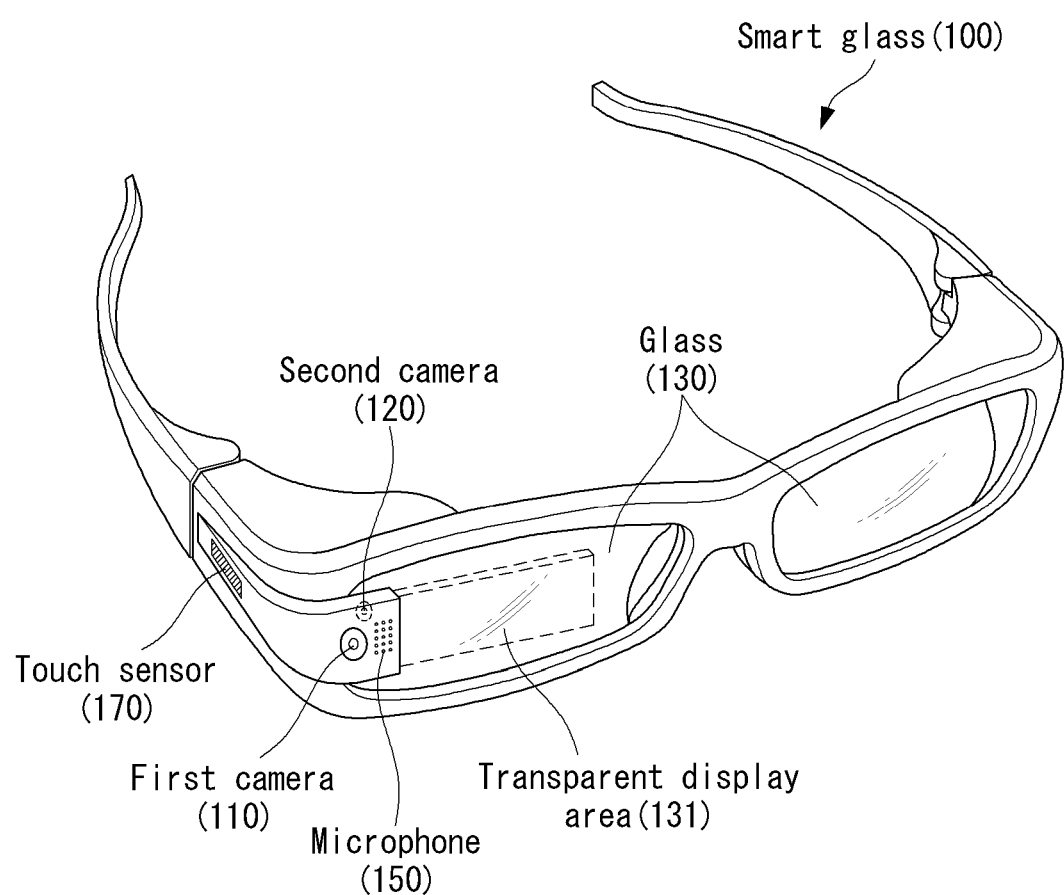
FIG. 2 is a perspective view of a smart glass according to an exemplary embodiment.

FIG. 1 is a block diagram of a smart glass 100 according to an exemplary embodiment. FIG. 2 is a perspective view of the smart glass 100 shown in FIG. 1. Other embodiments and arrangements may also be provided. FIG. 1 shows the smart glass 100 having various components, although other components may also be used. More or less components may alternatively be implemented. The smart glass 100 includes a first camera 110, a second camera 120, a glass 130, a controller 140, a microphone 150, an audio output device 160, a touch sensor 170, a memory 180, and a wireless communication device 190.

The components included in the smart glass 100 are described below.

The first camera 110 is used to take a front image of the smart glass 100 and may rotate up and down and side to side at a predetermined angle. The second camera 120 may be used to take an image of eyes of a user wearing the smart glass 100. The second camera 120 may also rotate up and down and side to side at a predetermined angle.

The glass 130 is as transparent as general glasses, and the user wearing the smart glass 100 may watch his or her front through the glass 130. FIG. 2 shows the smart glass 100 including two glasses like the general glasses, but the smart glass 100 may include only one glass.

The glass 130 may serve as a transparent display for providing information. FIG. 2 shows that only one glass 130 has a transparent display area 131, but each of the two glasses may have the transparent display area.

The controller 140 entirely controls an operation of the smart glass 100. Namely, the controller 140 entirely controls the components of the smart glass 100.

For example, the controller 140 may analyze an image taken with the first camera 110 and the second camera 120. The controller 140 performs an operation for obtaining information about a front object the user watches based on the image analysis and may provide the obtained information for the user through the transparent display area 131 of the glass 130. The controller 140 may analyze an image of the user's eyes taken with the first camera 110 and may execute a specific function corresponding to user's eye gesture recognized based on the result of the image analysis.

The microphone 150 may receive an external audio signal in a call mode, a recording mode and/or a speech recognition mode and may convert the received audio signal into electric audio data. The microphone 150 may employ various noise removal algorithms (or noise canceling algorithms) for removing or reducing a noise generated when the external audio signal is received.

The audio output device 160 may output audio data. The audio output device 160 may include a receiver, a speaker, a buzzer, and/or the like. The audio output device 160 may output sounds through an earphone jack. The user may hear the sounds by connecting an earphone to the earphone jack.

The touch sensor 170 may be configured to convert changes in a pressure or a capacitance applied by touching a predetermined area into an electrical input signal. The touch sensor 170 may be configured to detect a touch pressure as well as a touched position or area. The touch sensor 170 may be implemented as a proximity sensor. The proximity sensor has longer lifespan and more excellent utilization than a contact sensor. The date input through the touch sensor 170 may be used to execute the specific function of the smart glass 100.

The memory 180 may store a program for an operation of the controller 140 and also may temporarily store input/output data (for example, a phonebook, a message, a still image, a motion picture, etc.).

The memory 180 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The smart glass 100 may also operate in relation to a web storage that performs a storing function of the memory 180 on the Internet.

The wireless communication device 190 may include at least one module capable of wireless communication between the smart glass 100 and a wireless communication system. For example, the wireless communication device 190 may include a broadcast receiving module, a mobile communication module, a wireless Internet module, a local area communication module, a position information module, and the like. Other modules may be used for the wireless communication device 190.

A power supply device 200 may receive external power and internal power and may provide power required for operations of the components of the smart glass 100 under the control of the controller 140.

Various embodiments disclosed herein may be implemented within a recording medium that can be read by a computer or a computer-like device using software, hardware, or a combination thereof.

According to the hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 140.

According to the software implementation, embodiments such as procedures or functions may be implemented with a separate software module that executes at least one function or operation. Software codes may be implemented according to a software application written in an appropriate software language. The software codes may be stored in the memory 180 and executed by the controller 140.

Figure 3:
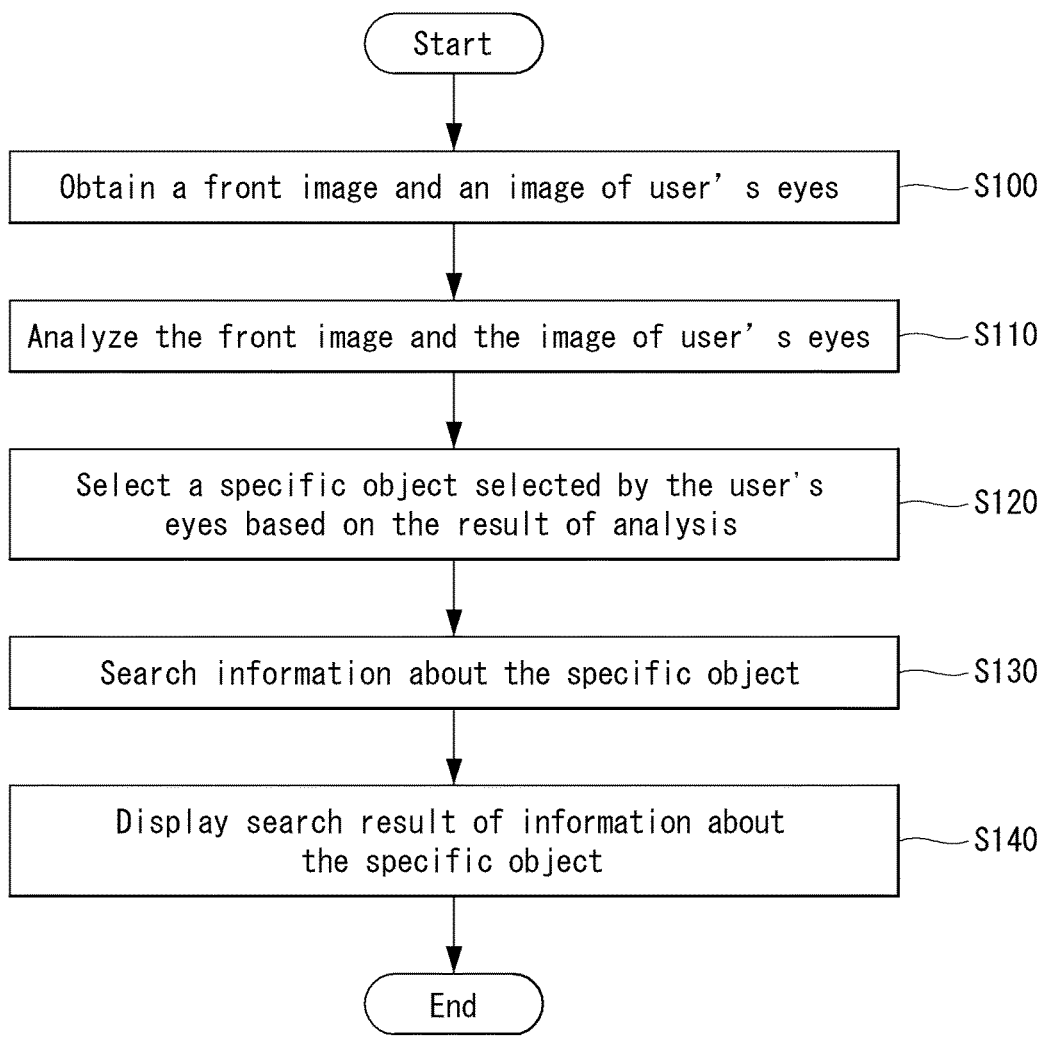
FIG. 3 is a flow chart showing an example of a method for driving a smart glass according to an exemplary embodiment.

FIG. 3 is a flow chart of an exemplary method for driving the smart glass 100 according to an embodiment as broadly described herein.

A front image and an image of the user's eyes are obtained through the first camera 110 and the second camera 120 in step S100. The controller 140 analyzes the front image and the image of the user's eyes in step S110. The controller 140 obtains the recognition of an object positioned in front of the user, a position of the user's eyes, etc. through the image analysis. Other information and data may be obtained through the image analysis of the controller 140.

Next, the controller 140 selects a specific object from a plurality of objects positioned in front of the user, selected by the user's gaze, based on the result of the image analysis in step S120. In the embodiment disclosed herein, examples of the object selected by the user's gaze may include, for example, an object at which the user gazes for a predetermined period of time, an object at which the user gazes a predetermined number of times or more, and the like.

When the specific object is selected by the user's gaze, the controller 140 searches and obtains information about the specific object in step S130. The information search for the specific object may be performed by the memory 180 provided with the smart glass 100. Alternatively, the information search for the specific object may be performed by a wireless network connected to the smart glass 100 through the wireless communication device 190. However, a range of the information search for the specific object is not limited thereto.

When the information about the specific object is obtained, the controller 140 may display the obtained information about the specific object on the transparent display area 131 of the glass 130 in step S140. Hence, the smart glass 100 may provide the user with the information about the object selected by his/her gaze.

The smart glass 100 as embodied and broadly described herein may obtain the information about the selected object through processing other than the search described above. For example, when the selected object is a foreign language text, the controller 140 may obtain a translation of the foreign language text as information about the selected object.

Figure 4:
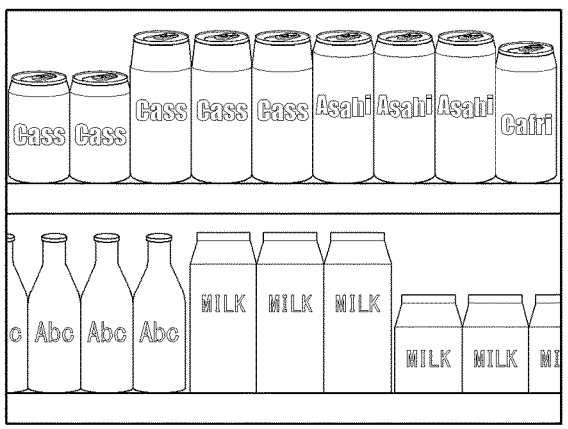
FIG. 4 shows an image obtained through the method for driving the smart glass shown in FIG. 3.
Figure 4:
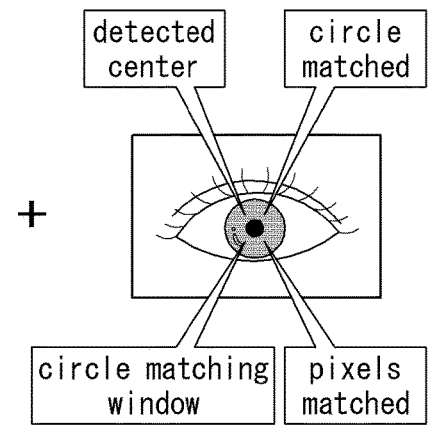

FIG. 4 shows an exemplary image obtained through the method for driving the smart glass 100 shown in FIG. 3.

The front image may be obtained by the first camera 110 corresponding to a front camera of the smart glass 100. The front image may be substantially the same as or different from a range recognized by the user's gaze. A camera for obtaining the front image may be a plurality of cameras including the first camera 110.

The image of the user's eyes may be obtained by the second camera 120. A camera for obtaining the image of the user's eyes may be a plurality of cameras including the second camera 120 in the same manner as the front image.

The controller 140 may confirm an angle of the user's gaze based on the front image and the image of the user's eyes and may accurately select the object the user wants to select.

Figure 5A:
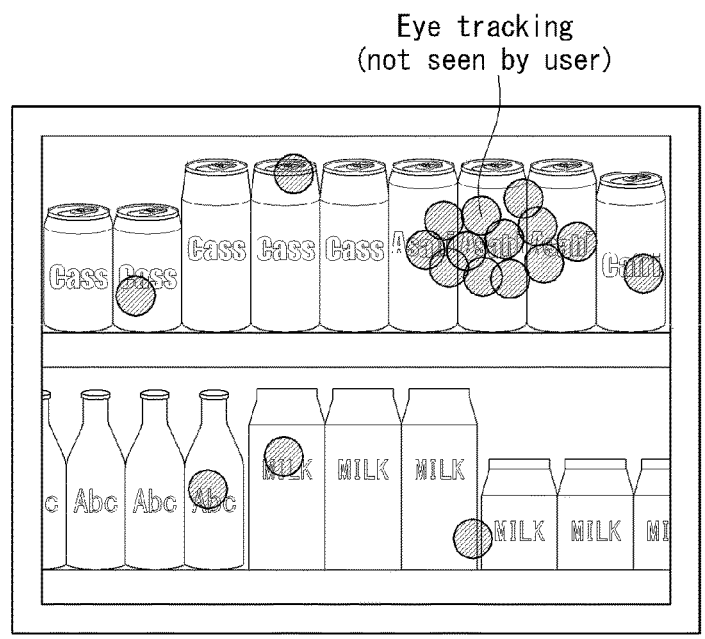
FIGS. 5A and 5B shows an example where a specific object is selected and information about the specific object is provided through the method for driving the smart glass shown in FIG. 3.
Figure 5B:
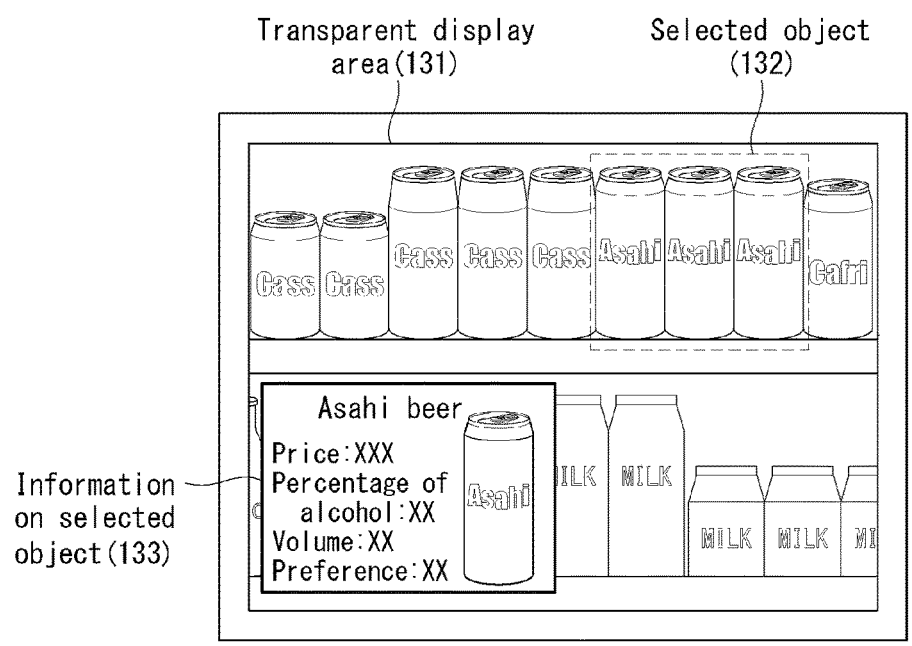

FIGS. 5A-5B provide an example where the specific object is selected and information about the specific object is provided through the method for driving the smart glass shown in FIG. 3;

FIG. 5A illustrates an eye tracking process which performs the image analysis through the controller 140 and grasps a position of the user's gaze toward the front image. The result of the eye tracking is not necessarily provided for the user/displayed on the display area 131.

FIG. 5B illustrates that a specific object 132, for example, a canned beverage, included in the front image is selected by the user's gaze as the result of the eye tracking and information 133 about the selected object 132 is displayed on the transparent display area 131. As described above, the information about the selected object 132 may be a search result of a specific network or a search result of the memory 180.

The smart glass 100 as embodied and broadly described herein may provide the user with the information about the object selected by his/her gaze. If information about all of a plurality of objects included in the front image are displayed, user's front view may be obstructed. However, the smart glass 100 as embodied and broadly described herein may prevent the user's front view from being obstructed.

Figure 6:
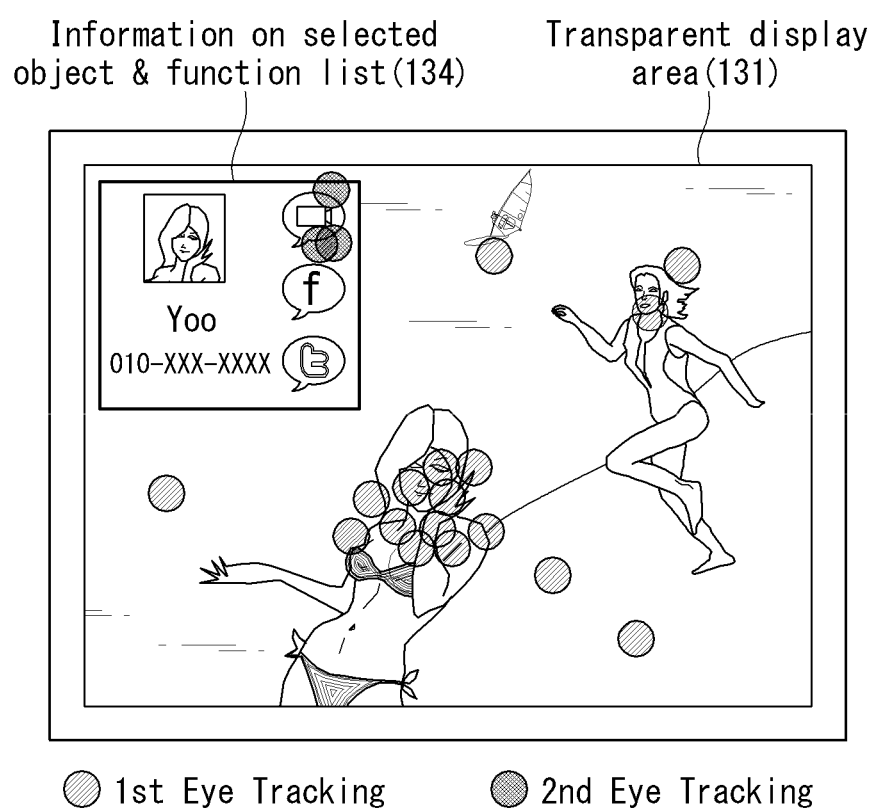
FIG. 6 shows another example where a specific object is selected and information about the specific object is provided through the method for driving the smart glass shown in FIG. 3.

FIG. 6 shows another example where a specific object is selected and information about the specific object is provided through the method for driving the smart glass 100 shown in FIG. 3.

When the front image includes a plurality of humans, the controller 140 performs a first eye tracking on the user's eyes and selects a specific human. The controller 140 displays information about the selected specific human and a graphic user interface 134 including a function list for performing a specific function on the specific human on the transparent display area 131 of the glass 130.

As can be seen from FIG. 6, the specific human is selected, and the function list capable of performing video capability, Facebook, and Twitter of the specific human is included in the graphic user interface 134. The function list may be previously determined based on attributes of the selected object. Namely, the function list shown in FIG. 6 may be used when the object selected by the user's gaze is the human.

As another example, when a specific article is selected by the user's gaze, the controller 140 may display information about the specific article and the graphic user interface 134 including a function for buying the specific article, a function for obtaining additional information about the specific article, etc. on the transparent display area 131 of the glass 130.

After the graphic user interface 134 is provided, the controller 140 may perform a second eye tracking on the user's eyes and may select and execute one function included in the function list of the graphic user interface 134. For example, FIG. 6 shows that the smart glass 100 may execute a video capability function as the user gazes at an area corresponding to the video capability function of the specific human included in the graphic user interface 134.

Figure 7A:
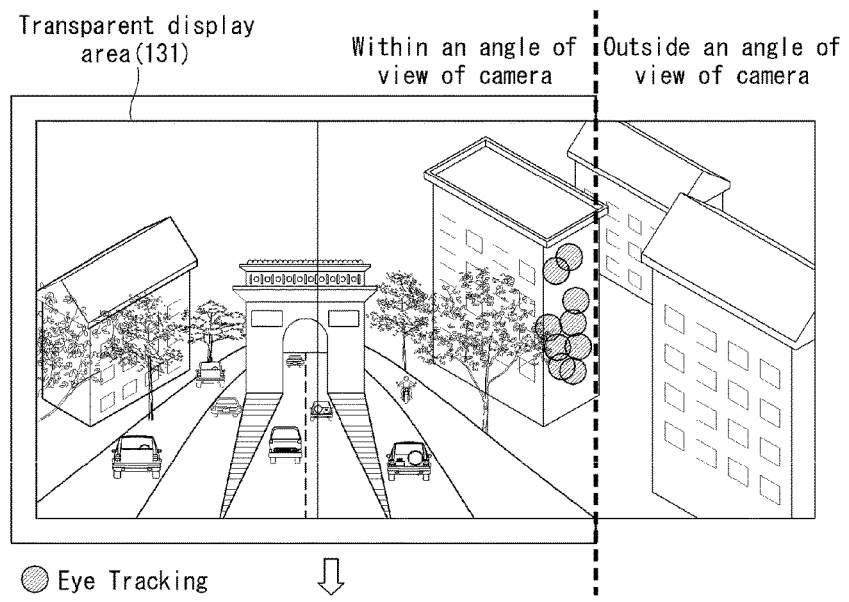
FIGS. 7A and 7B shows an example of providing an image outside an angle of view of a camera in a smart glass according to an exemplary embodiment.
Figure 7B:
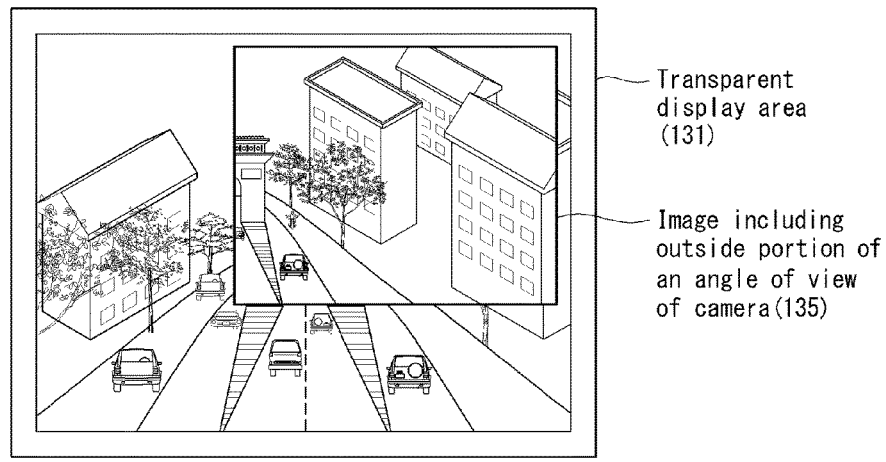

FIGS. 7A-7B provide an example of providing an image outside an angle of view of a camera in the smart glass 100 as embodied and broadly described herein.

FIG. 7A shows that when a front image is provided within an angle of view of a camera, the user gazes at an edge of the glass 130 corresponding to a right outside direction of the angle of view.

As shown in FIG. 7B, the controller 140 rotates the first camera 110 in a right direction and controls the first camera 110 so as to obtain an image including an outside area of the angle of view of the camera 110. Hence, the controller 140 may display an obtained image 135 on the transparent display area 131 of the glass 130.

Accordingly, the smart glass 100 as embodied and broadly described herein may easily provide the user with an image in the outside area of the angle of view of the camera through the movement of the user's gaze when the user gazes at one edge of the glass 130 for a predetermined period of time or gazes at one edge of the glass 130 a predetermined number of times or more within a fixed period of time.

As shown in FIGS. 7A-7B, the smart glass 100 rotates the first camera 110 based on a range of the angle of view of the camera 110 and a direction of the user's gaze and obtains an additional front image. However, embodiments are not limited thereto. For example, the smart glass 100 may rotate the first camera 110 based on a range the user's view reaches and the direction of the user's gaze, thereby obtaining and providing the additional image.

Figure 8:
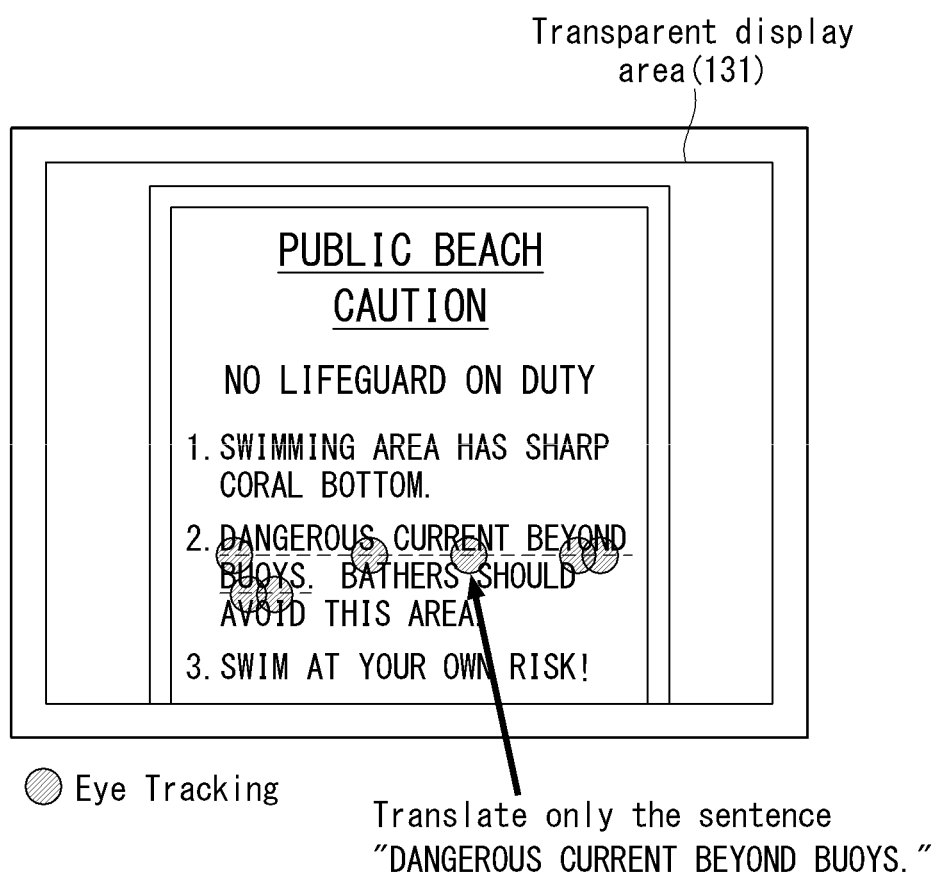
FIG. 8 shows another example where a smart glass according to an exemplary embodiment provides information about an object selected from a front image.

FIG. 8 shows another example where the smart glass 100 as embodied and broadly described herein provides information about an object selected from a front image.

The front image includes a board in a foreign language. In the embodiment disclosed herein, a specific text group is selected by the user's gaze. Hence, the controller 140 may perform a translation of the selected specific text group and may display the translation on the transparent display area of the smart glass 100.

Figure 9:
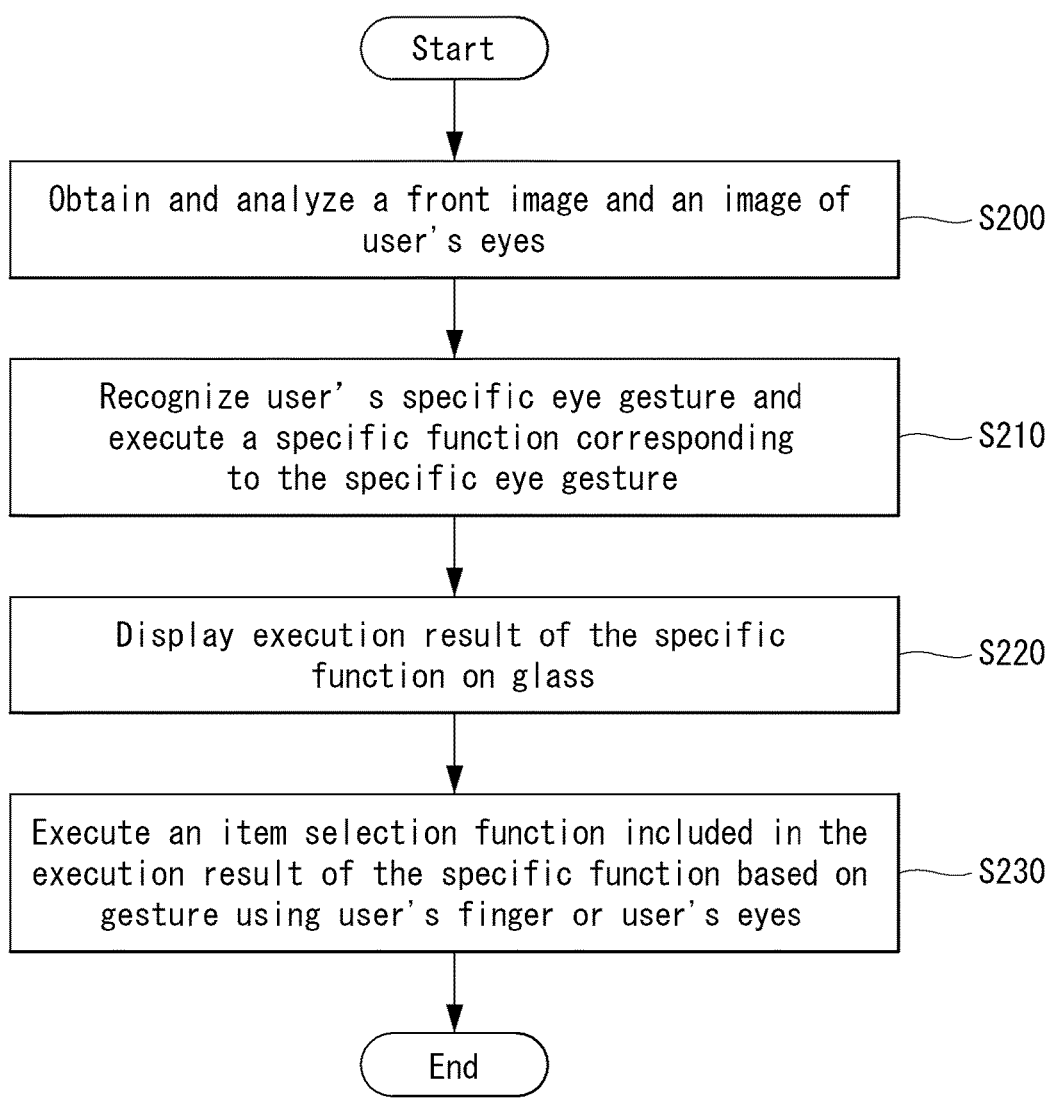
FIG. 9 is a flow chart showing another example of a method for driving a smart glass according to an exemplary embodiment.

FIG. 9 is a flow chart of another exemplary method for driving the smart glass 100 as broadly described herein.

The controller 140 obtains a front image through the front camera 110 and an image of the user's eyes through the second camera 120 and analyzes the front image and the image of the user's eyes in step S200. The controller 140 recognizes user's specific eye gesture based on the result of the image analysis and executes a specific function corresponding to the specific eye gesture in step S210.

In the embodiment disclosed herein, examples of the user's eye gesture may include the eye blinking, the opening of eyes for a predetermined period of time, the closing of eyes for a predetermined period of time, the number of gaze operations using the eyes, and other such gestures such that embodiments are not limited thereto. The user's eye gesture may be recognized using only one eye or both eyes of the user.

The controller 140 displays an execution result of the specific function corresponding to the specific eye gesture on the transparent display area 131 of the smart glass 100 in step S220. The controller 140 may execute an item selection function included in the execution result of the specific function based on a gesture using the user's finger obtained through the analysis of the front image obtained by the first camera 110 or the user's gaze obtained through the analysis of the image of the user's eyes obtained by the second camera 120 in step S230. The controller 140 may display an execution result of a function corresponding to the selected item on the transparent display area 131 of the glass 130.

Figure 10:
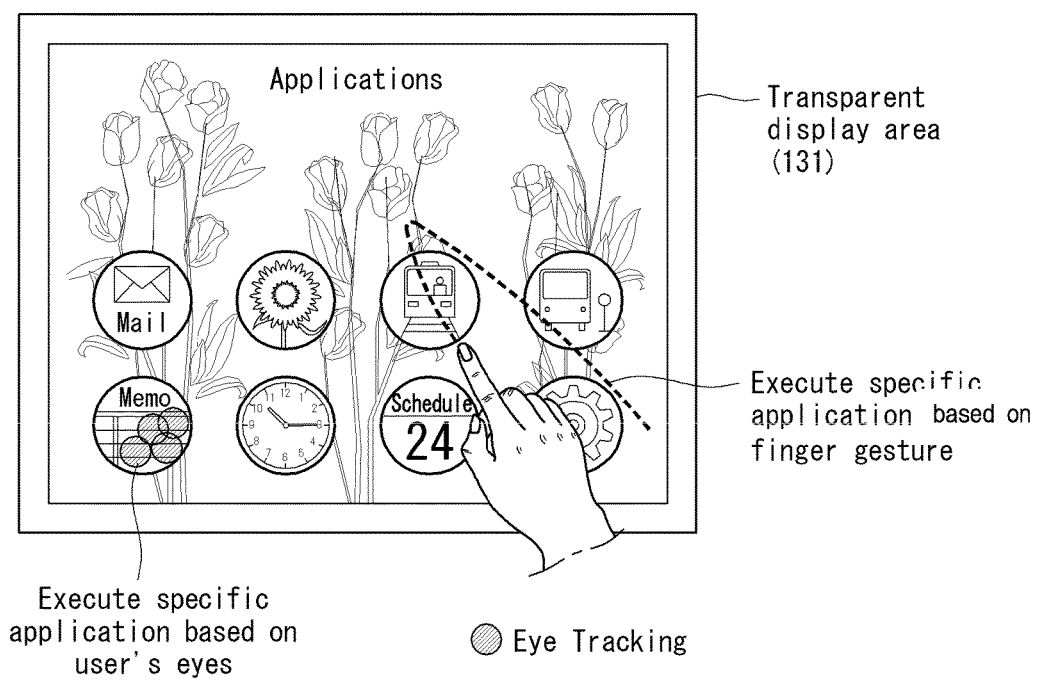
FIG. 10 shows an example of a function executed through the method for driving the smart glass shown in FIG. 9.

FIG. 10 shows an example of a function executed through the method for driving the smart glass 100 shown in FIG. 9.

More specifically, FIG. 10 shows that when a specific eye gesture (for example, the closing of one eye of the user for a predetermined period of time) is recognized, an execution result of an application list display function on the smart glass 100 is displayed on the transparent display area 131 of the glass 130.

The user may select an icon of a specific application included in an application list displayed on the transparent display area 131 through his/her finger gesture taken with the first camera 110 and may execute the specific application. The execution screen of the specific application may be displayed on the transparent display area 131.

The controller 140 may select the specific application through the matching between position information of the finger gesture and a position of the specific application list displayed on the transparent display area 131 in a virtual space.

The user gazes at the icon of the specific application among icons included in the application list and thus may execute the specific application.

Figure 11:
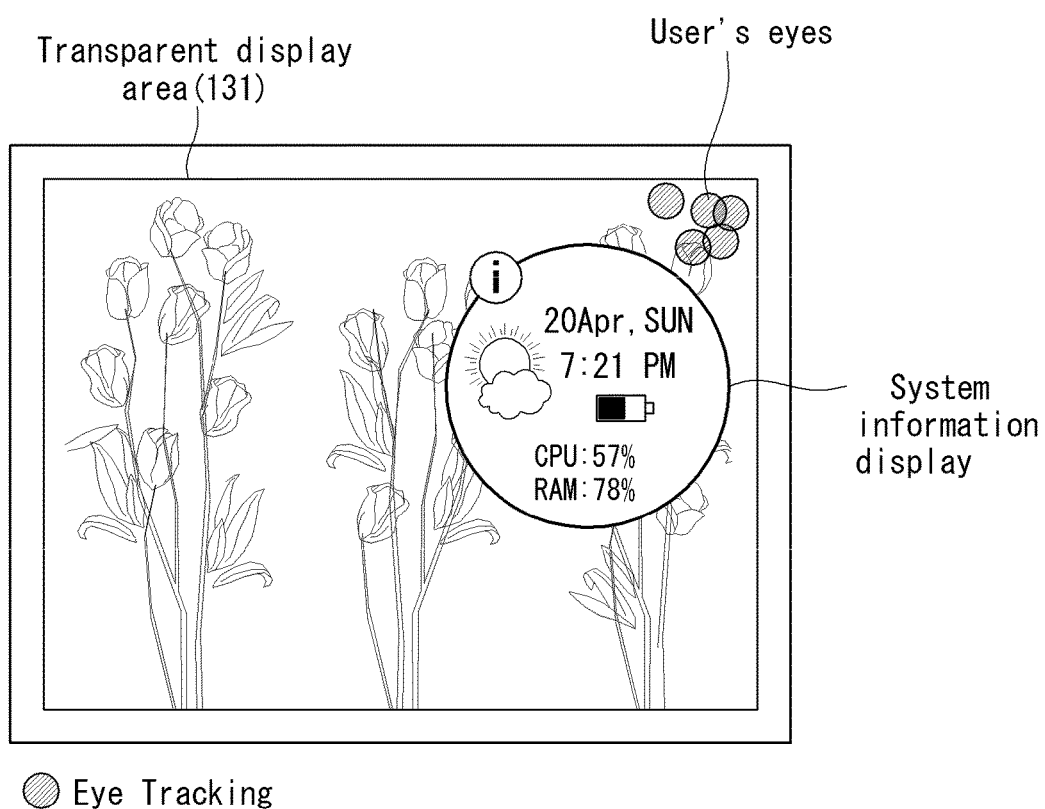
FIG. 11 shows another example of a function executed through the method for driving the smart glass shown in FIG. 9.

FIG. 11 shows another example of a function executed through the method for driving the smart glass 100 shown in FIG. 9.

More specifically, FIG. 11 shows that when the user gazes at a right upper edge of the glass 130, the controller 140 displays system information of the smart glass 100 on the transparent display area 131 of the glass 130.

Namely, as shown in FIG. 11, when an eye gesture, in which the user gazes at a specific area of the glass 130, is recognized, the controller 140 displays previously determined information about the eye gesture on the transparent display area 131 of the glass 130.

Figure 12:
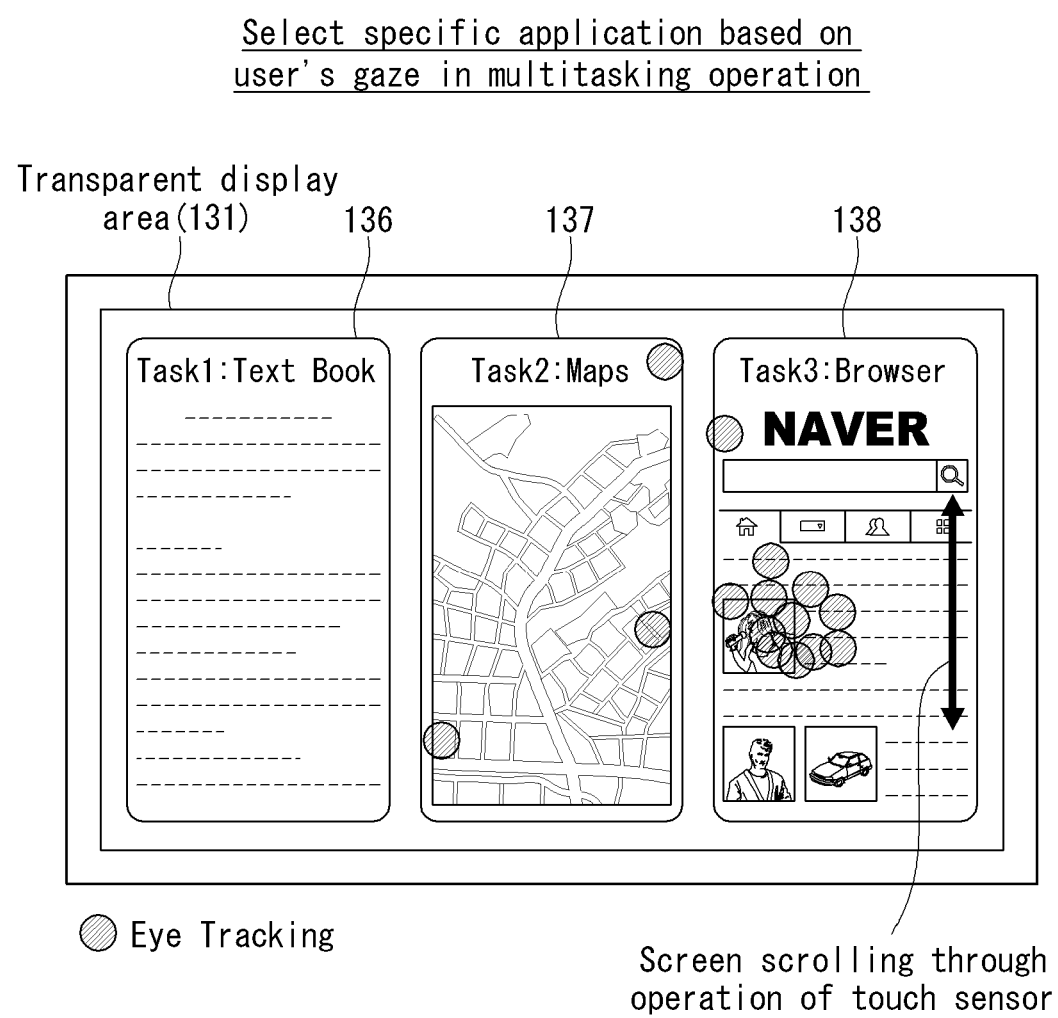
FIG. 12 shows an example where a smart glass according to an exemplary embodiment performs a multitasking function.

FIG. 12 shows an example where the smart glass 100 as embodied and broadly described herein performs a multi-tasking function.

A plurality of applications may be executed, and execution screens 136, 137 and 138 of the applications may be displayed on the transparent display area 131 of the glass 130. In this state, when the user gazes at the execution screen of a specific application, the controller 140 activates a control function of the specific application.

When the user moves a touch through the touch sensor 170 in a predetermined direction, the controller 140 may perform a scroll function on the execution screen of the specific application.

Figure 13:
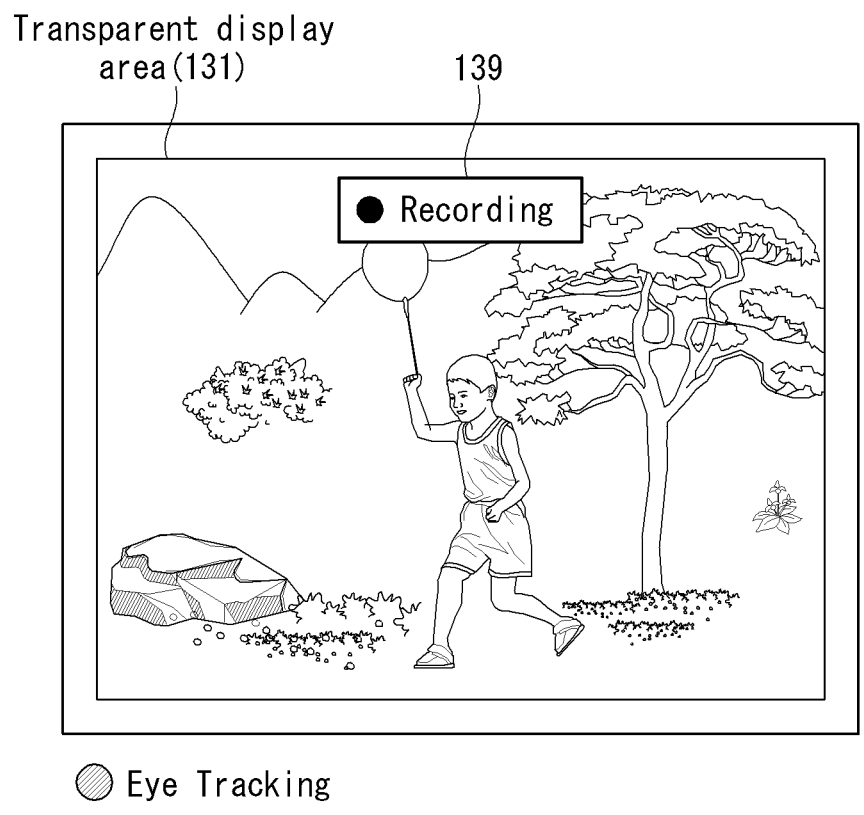
FIG. 13 illustrates a recording function of a front image of a smart glass according to an exemplary embodiment.

FIG. 13 illustrates a recording function of a front image performed by the smart glass 100 as embodied and broadly described herein.

The controller 140 senses whether or not the user's eyes are closed for a predetermined period of time. When it is sensed that the user's eyes are closed, the controller 140 may start to record the front image obtained through the first camera 110. When it is sensed that the user's eyes are opened, the controller 140 may stop recording the front image. In this instance, as shown in FIG. 13, the controller 140 displays a message 139, indicating that the front image is recording, on the transparent display area 131 of the glass 130.

A recording function of the front image may be very useful when the user previously sets a decisive moment the user does not want to miss. The user may set whether or not to perform the recording function of the front image, and also may change the setting of the conditions of the recording function. More specifically, the user may previously set a date, at which the recording function of the front image will be performed, and change the setting of eye's closing time corresponding to the conditions of the recording function.

Figure 14:
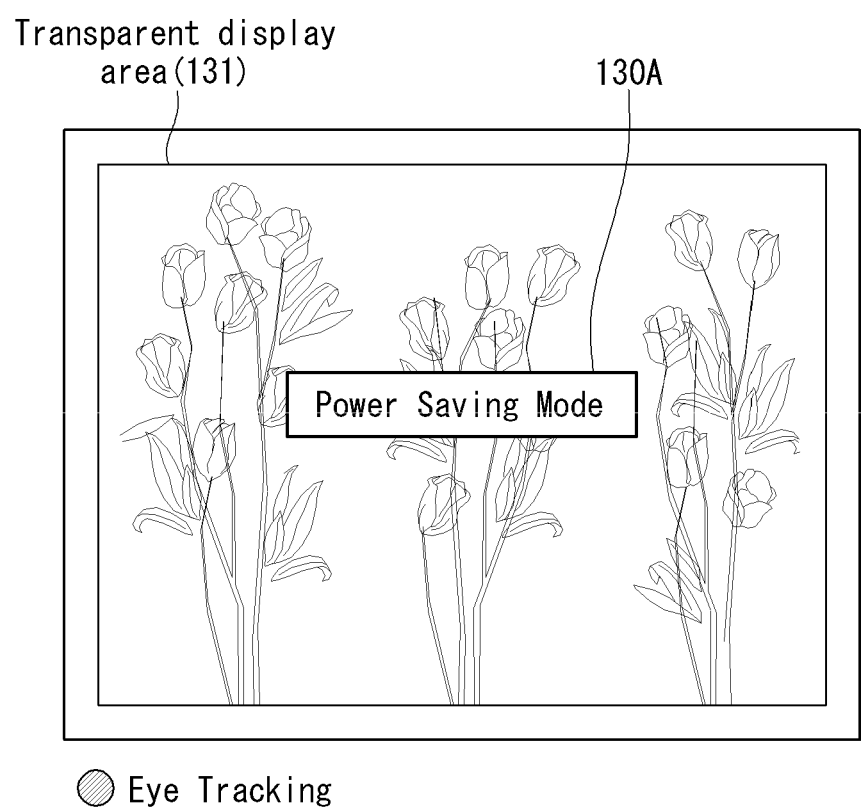
FIG. 14 illustrates a power-saving function of a smart glass according to an exemplary embodiment.

FIG. 14 illustrates a power-saving function performed by the smart glass 100 as embodied and broadly described herein.

When it is sensed that the user's eyes are closed for a predetermined period of time, the controller 140 may operate the smart glass 100 in a power-saving mode. In this instance, the controller 140 may display a message 130A, indicating that the smart glass 100 is operating in the power-saving mode, on the transparent display area 131 of the glass 130. The user may set whether or not to perform the power-saving mode, and also may change the setting of the conditions of the power-saving mode. The power-saving mode may be removed when the user opens his/her eyes, or through an operation of a specific button of the smart glass 100 or the touch sensor 170.

Figure 15A:
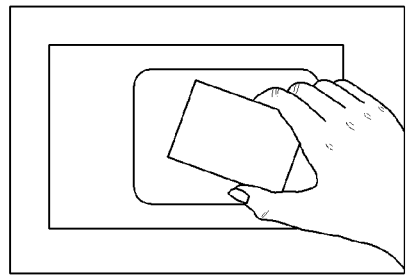
FIGS. 15A-15C shows an example where a smart glass according to an exemplary embodiment performs a specific function through an eye tracking and a position tracking.
Figure 15A:
Figure 15B:
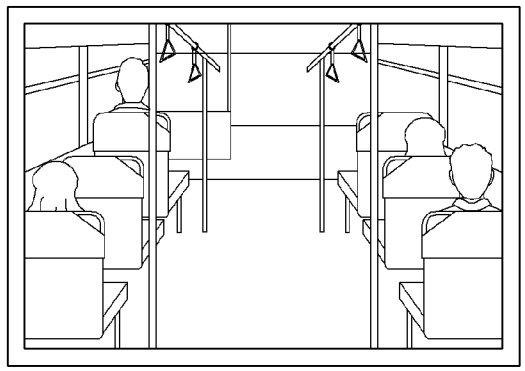
Figure 15B:
Figure 15C:
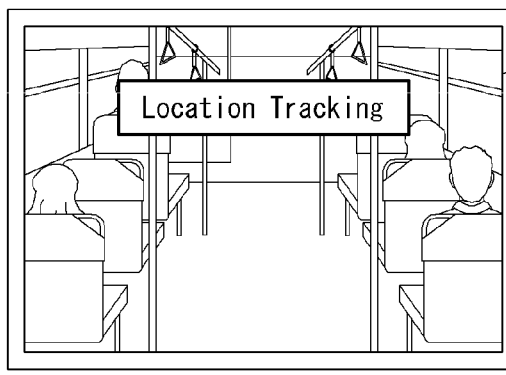

FIGS. 15A-15C provide an example where the smart glass 100 as embodied and broadly described herein performs a specific function through an eye tracking and a position tracking.

As shown in FIG. 15A, when the user NFC (near field communication) tags a public transportation card to a public transportation system, the smart glass 100 recognizes it. Hence, the controller 140 may recognize that the user gets on public transportation. In this instance, the smart glass 100 may recognize it through the NFC of the public transportation card or the public transportation system.

As shown in FIG. 15B, when it is recognized that the user gets on specific public transportation, the controller 140 senses that the user dozes through periodic eye tracking. As shown in FIG. 15C, when it is recognized that the user dozes, the controller 140 performs an alarm function at a location at which the user has to get off of the public transportation to reach a desired destination, through position tracking.

GPS-based position recognition technology, cell location-based position recognition technology, Wi-Fi-based position recognition technology, etc. may be used in the position tracking of the user. However, embodiments are not limited thereto.

The above-described method for controlling the smart glass 100 may be written as computer programs and may be implemented in digital microprocessors that execute the programs using a computer readable recording medium. The method for controlling the smart glass 100 may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

Embodiments provide a smart glass capable of taking and analyzing a front image and an image of user's eyes and providing information about a front object selected by user's gaze based on the result of an analysis.

Embodiments also provide a smart glass capable of analyzing an image of user's eyes and executing a specific function corresponding to user's eye gesture recognized based on the result of an analysis.

In one embodiment as broadly described herein, a smart glass may include a glass having a transparent display function, a first camera configured to obtain a front image, a second camera configured to obtain an image of user's eyes, and a controller configured to analyze the front image and the image of the user's eyes, determine a specific object selected by user's gaze among objects included in the front image based on the result of an analysis, obtain information about the specific object, and display the information about the specific object on a transparent display area of the glass.

The smart glass may further include a memory configured to store information, and a wireless communication unit connected to a predetermined wireless network. The controller may be connected to the memory or the predetermined wireless network and may obtain the information about the specific object.

The controller may further display a graphic object, indicating that the specific object is selected by the user's gaze, on the transparent display area of the glass, so that the graphic object is matched with the specific object seen by the user through the glass.

The controller may display a function list, which is previously determined based on attributes of the selected object, on the transparent display area of the glass. The controller may execute a function selected by the user's gaze in the function list.

When it is recognized that the user gazes at one edge of the glass, the controller may rotate the first camera in a direction of the one edge of the glass and may display an image taken with the rotated first camera on the transparent display area of the glass.

When it is recognized that the user gazes at one edge of the glass gaze times, which is previously determined, for a previously determined period of time, the controller may rotate the first camera in a direction of the one edge of the glass and may display an image taken with the rotated first camera on the transparent display area of the glass.

In another embodiment, a smart glass may include a glass having a transparent display function, a first camera configured to obtain a front image, a second camera configured to obtain an image of user's eyes, and a controller configured to analyze the front image and the image of the user's eyes, execute a specific function corresponding to user's specific eye gesture when the user's specific eye gesture is recognized as the result of an analysis, and display an execution result of the specific function on a transparent display area of the glass, wherein the controller performs an item selection function included in the execution result of the specific function based on a gesture using user's finger recognized as the result of an analysis of the front image or user's gaze recognized as the result of an analysis of the image of the user's eyes.

When the user's specific eye gesture is recognized, the controller may display an application icon list on the glass. Further, the controller may execute an application corresponding to an icon selected from the application icon list based on the gesture using the user's finger or the user's gaze and may display the execution result on the glass.

When an eye gesture, in which the user gazes at a specific area of the glass, is recognized, the controller may perform a function for displaying previously determined information about the eye gesture on the transparent display area of the glass.

When the eye gesture, in which the user gazes at the specific area of the glass, is recognized, the controller may perform a function for displaying system information of the smart glass on the transparent display area of the glass.

A smart glass as embodied and broadly described herein may take and analyze the front image and the image of the user's eyes and may provide information about the specific object selected by the user's gaze based on the result of an analysis.

A smart as embodied and broadly described herein may analyze the image of the user's eyes and may execute the specific function corresponding to the user's eye gesture recognized based on the result of an analysis.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A smart glass, comprising:
   a glass having a transparent display function;
   a first camera operably coupled to the glass and configured to obtain a first image in a first direction with respect to the glass;
   a second camera operably coupled to the glass configured to obtain a second image in a second direction with respect to the glass, the second direction being substantially opposite the first direction; and
   a controller configured to analyze the first image and the second image, to determine a selected object from a plurality of objects included in the first image based on a result of the analysis of the first image and the second image, to obtain information related to the selected object, and to display the information related to the selected object on a transparent display area of the glass,
   wherein the controller is configured to determine that a concentration of the second image is directed at one edge of the glass, and to rotate the first camera in a direction corresponding to the one edge of the glass and to display an image captured by the first camera in the rotated position on the transparent display area of the glass.

2. The smart glass of claim 1, further comprising:
   a memory configured to store information; and
   a wireless communication configured to communicate with a predetermined wireless network, wherein the controller is connected to at least one of the memory or the predetermined wireless network, and wherein the controller is configured to search the at least one of the memory or the predetermined wireless network to obtain the information related to the selected object.

3. The smart glass of claim 1, wherein the controller is further configured to display a graphic object on the transparent display area of the glass indicating that the selected object has been selected, such that the graphic object is overlaid on the selected object visible through the glass in the first direction.

4. The smart glass of claim 1, wherein the controller is further configured to display a function list on the transparent display area of the glass in response to the determination that the selected object has been selected, the function list being previously determined based on attributes of the selected object, and
wherein the controller is configured to determine that a function selected from the function list has been selected based on a corresponding change in the second image, and to execute the selected function.

5. The smart glass of claim 1, wherein, when the controller determines that the concentration of the second image has been directed to one edge of the glass for a predetermined amount of time, or that the concentration has moved away from and returned to the one edge of the glass a predetermined number of times or more within a predetermined time period, the controller is configured to rotate the first camera in a direction corresponding to the one edge of the glass and to display an image captured by the first camera in the rotated position on the transparent display area of the glass.

6. The smart glass of claim 1, wherein the smart glass comprises a wearable device, wherein the first camera faces forward with respect to the glass so as to capture a front image in front of a wearer of the smart glass, and the second camera faces rearward with respect to the glass so as to capture an ocular image of the wearer of the smart glass.

7. The smart glass of claim 6, wherein the controller is configured to match a gaze of an eye of the wearer captured in the ocular image with one of the plurality of objects in front of the wearer to determine the selected object.

8. The smart glass of claim 7, wherein the controller is configured to recognize a gesture based on a movement of the gaze captured in the ocular image, and to execute a specific function corresponding to the recognized gesture.

9. The smart glass of claim 8, wherein the recognized gesture comprises a movement of the gaze to one edge of the glass that is sustained for greater than or equal to a predetermined time, or a return of the gaze to the one edge of the glass a predetermined number of times or more within a predetermined period of time, and wherein the controller is configured to rotate the first camera in a direction corresponding to the one edge of the glass in response to the recognized gesture and to display an image captured by the first camera in the rotated position on the transparent display area.

10. The smart glass of claim 6, wherein the ocular image captured by the second camera comprises a series of ocular images or a moving ocular image.

11. The smart glass of claim 1,
wherein the controller is further configured to execute a specific function corresponding to a first gesture recognized in the second image based on the analysis of the first and second images, and to display an execution result of the specific function on the transparent display area of the glass, wherein displaying the execution result includes displaying graphical objects, and
wherein the controller is further configured to perform an item selection function in response to a second gesture recognized in the first image, the second gesture is a finger or hand gesture performed within a viewing area of the first camera, and the item selection function includes matching position information of the finger or hand gesture with a virtual position associated with one of the displayed graphical objects.

12. The smart glass of claim 11, wherein the graphical objects are included in an application icon list, and the controller is further configured to execute an application corresponding to an icon selected from the application icon list based on the second gesture, and to display the execution result on the glass.

13. The smart glass of claim 11, wherein the first gesture comprises an eye gesture, in which a user gazes at a specific area of the glass, wherein, when the first gesture is recognized, the controller is configured to display previously determined information related to the eye gesture on the transparent display area of the glass.

14. The smart glass of claim 13, wherein the second gesture further comprises another eye gesture performed by the user, wherein the other eye gesture is recognized based on the analysis of the second image.

* * * * *